United States Patent
Ozdemir

(10) Patent No.: US 7,036,070 B1
(45) Date of Patent: Apr. 25, 2006

(54) ERROR MONITORING SYSTEM AND METHOD

(75) Inventor: Hakan Ozdemir, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 469 days.

(21) Appl. No.: 10/246,952

(22) Filed: Sep. 19, 2002

(51) Int. Cl.
*G06F 11/00* (2006.01)

(52) U.S. Cl. ........................................... 714/801

(58) Field of Classification Search ........... 714/746, 714/751, 800–802, 807; 370/517
See application file for complete search history.

(56) References Cited

U.S. PATENT DOCUMENTS 6,493,847 B1 *  12/2002  Sorgi et al. ............... 714/800
6,738,395 B1 *   5/2004  Diaconescu et al. ....... 370/517
6,775,799 B1 *   8/2004  Giorgetta et al. ......... 714/751

OTHER PUBLICATIONS

Trost, Robert, Bit error rate monitoring for a SONET/SDH framer, Apr. 2001, www.google.com, p. 1 to 23.*

* cited by examiner

*Primary Examiner*—Shelly Chase
(74) *Attorney, Agent, or Firm*—Law Office of Dale B. Halling, LLC

(57) ABSTRACT

An error monitoring system for a transceivers includes a multiplexer and a parity calculating circuit. A comparator has a first input that is coupled to the multiplexer and a second input that is coupled to the parity calculating circuit.

20 Claims, 3 Drawing Sheets

|  | OC12 | OC48 | OC192 | OTNk |
|---|---|---|---|---|
| Initial LFSR 56 | 111_1111 | 111_1111 | 111_1111 | 1111_1111_1111_1111 |
| Polynomial 58 | $1 + x^6 + x^7$ | $1 + x^6 + x^7$ | $1 + x^6 + x^7$ | $1 + x + x^3 + x^{12} + x^{16}$ |
| Initial Scrambler Value (hex) 60 | 0xFE | 0xFE | 0xFE | 0xFF |
| Scrambling starts at column 62 | 37 | 145 | 577 | 7 |
| Column per row 64 | 1080 | 4320 | 17280 | 4080 |
| B1 position 66 | Column 1 Row 2 | Column 1 Row 2 | Column 1 Row 2 | Column 9 Row 1 |
| Increment 68 | 1044 | 4176 | 16704 | 2 |
| Scrambler Value for B1 field (hex) 70 | 0x1A | 0x02 | 0x1E | 0x4E |

FIG. 2

ERROR MONITORING SYSTEM AND METHOD

FIELD OF THE INVENTION

The present invention relates generally to the field of data communication systems and more particularly to an error monitoring system and method for a backplane transceiver.

BACKGROUND OF THE INVENTION

Communication systems require backplane transceivers to strengthen and potentially shape the signal. The optical communication systems use communication standards that require that the signal be scrambled. The scrambling ensures an adequate number of transitions in the signal for the phase lock loops to synchronize. At the repeater the signals are descrambled before the signals are boosted and transmitted in some systems.

Parity information is placed in the frame before scrambling. Therefore, in order for the backplane transceiver to monitor the parity errors in the received frame, certain byte locations of the frame have to be descrambled.

Each signal requires a descrambler. The descrambling circuitry is complicated by the high data rates of the signals involved.

Thus there exists a need for a descrambling method that is simpler and less expensive to produce.

SUMMARY OF INVENTION

An error monitoring system for a transceiver includes a multiplexer and a parity calculating circuit. A comparator has a first input that is coupled to the multiplexer and a second input that is coupled to the parity calculating circuit. In one embodiment, the system includes an exclusive OR gate with a first input coupled to the multiplexer and a second input coupled to a scrambled parity field register. In another embodiment, the multiplexer is coupled to a plurality of registers. In another embodiment, the plurality of registers hold a parity field scrambler value for a communication format. In another embodiment, the multiplexer has a frame type input. In one embodiment, an output of the exclusive OR gate is coupled to an input of the comparator.

In one embodiment, a method of error monitoring includes the steps of pre-calculating a scrambler value for a parity field. The scrambler value is exclusive ORed with a received scrambled parity value to form a received parity value. Next, the received parity value is compared with a calculated parity value. In one embodiment, a plurality of scrambler values are calculated for the parity fields of a plurality of communication standards.

In one embodiment, a frame type is determined. Next, one of a plurality of scrambler values for the parity fields of a plurality of communication standards is retrieved.

In one embodiment, a field location of the received scrambled parity value is determined.

In one embodiment, a linear feedback shift register polynomial is determined. Then an initial value is determined. In another embodiment, a location of the received parity value is determined. Next the scrambler value for the location is calculated.

In one embodiment, a frame of data is received. Next, the parity value for a relevant portion of the frame of data is calculated.

In one embodiment, a method of error monitoring includes the steps of calculating an error code value for a frame of data to form a calculated error code value. Only an error code field of a next frame of data is descrambled to form a received error code value. The received error code value is compared to the calculated error code value. In another embodiment, a frame type is determined. Then coverage of the error code value is determined. The error code in some frames only covers or applies to part of the frame. This is important to know for the error monitoring system to work correctly.

In another embodiment, a scrambler polynomial for a communication format is determined. Then an initial scrambler value for the communication format is determined. Next, a position of the error code field in a frame for the communication format is determined. An error code field scrambler value is calculated with this information. Next, the error code field scrambler value is exclusive ORed with a scrambled error code field to form the received error code value.

In one embodiment, a format of the frame of data is determined. Next, the scrambler value that corresponds to the format is retrieved. The scrambler value is exclusive ORed with the error code field to form the received error code value.

BRIEF DESCRIPTION OF THE DRAWINGS

FIG. 2 is a chart of relevant parameters used in an error monitoring system and method, for a variety of communication formats, in accordance with one embodiment of the invention;

DETAILED DESCRIPTION OF THE DRAWINGS

Error monitoring in transceivers for communication systems is done with a parity field. Commonly the parity field is a BIP-8 or bit interleaved parity 8 field inserted into each frame of data. In the BIP-8 code word an even parity scheme is used and is calculated across matching bit positions for distinct bytes in a frame. For instance, the first BIP-8 bit would correspond to even parity across bit number one of a certain number of bytes of a frame. The transmitter places the parity information in a specific overhead location of the frame, B1 byte for SONET, and BIP-8 field for OTNk (Optical Transport Network) frames. The k stands for a data rate, k=1–>2 488 320 kbit/s, 2–>9 953 280 kbit/s, 3–>39 813 120 kbit/s. The transmitter calculates the BIP-8 over all bits after the last bit of the Z0 byte of the previous SONET frame after scrambling and places the BIP-8 parity value in the B1 byte of the current frame before scrambling. For the OTNk frames, the BIP-8 code is calculated only over the payload of the frame, which is scrambled. The BIP-8 code is placed in the same frame it covers. In SONET (OC) frames it is placed in the next following frame; in OTN frames it is placed in the $2^{nd}$ following frame. Note that both SONET and OTNk use frame synchronous scramblers. Using this information the present description provides a more efficient error monitoring system for use in transceivers. The invention is described with respect to parity error monitoring codes, but could equally apply to other error monitoring codes.

Figure 1:
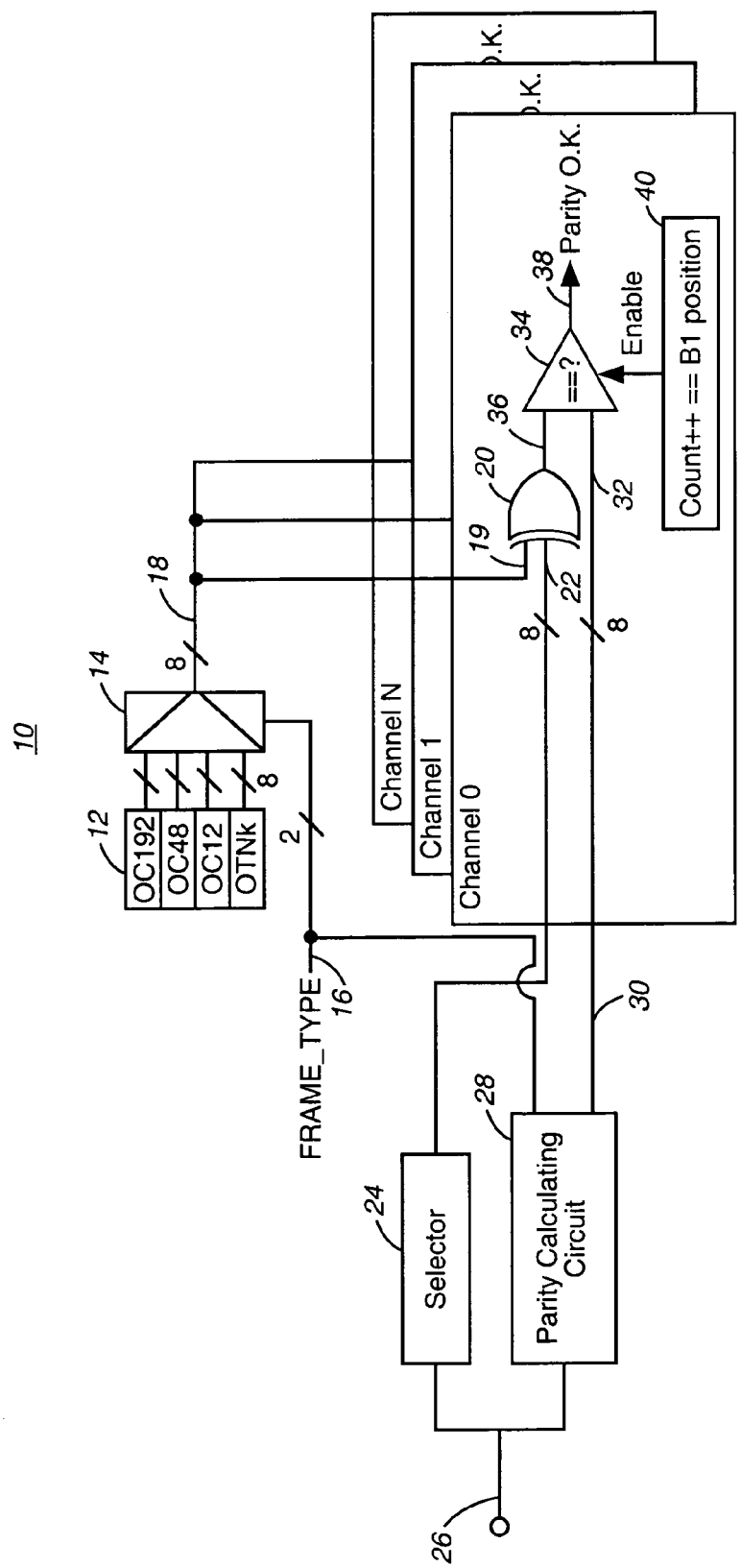
FIG. 1 is a block diagram of an error monitoring system in accordance with one embodiment of the invention.

FIG. 1 is a block diagram of an error monitoring system 10 in accordance with one embodiment of the invention. The system 10 has a plurality of registers 12 that hold the parity field scrambler values. The drawing shows the scrambled parity field registers holding values for SONET frames OC192, OC48, OC12 and OTNk frames. The registers 12 are coupled to a multiplexer 14. An input 16 to the multiplexer 14 is a frame type. The output 18 of the multiplexer is coupled to an input 19 of an exclusive OR gate 20. The second input 22 of the exclusive OR gate 20 is coupled to a selector 24. The selector 24 passes a received scrambled parity value to the exclusive OR gate 20. The selector 24 is coupled to a channel zero input 26. A parity calculating circuit 28 is also coupled to the channel zero input 26 and to the frame type input 16. The output 30 of the parity calculating circuit 28 is a calculated parity value. The output 30 of the parity calculating circuit 28 is coupled to the input 32 of a comparator 34. The other input 36 of the comparator 34 is coupled to the output of the exclusive OR gate 20. The output of the exclusive OR gate 20 is the descrambled received parity value. The output 38 of the comparator is parity O.K. signal. A counter 40 keeps track of the byte positions with respect to the frame alignment markers. When the parity field position reached, the comparator is enabled. In one embodiment, the parity field scrambler value is programmed during the boot-up sequence through an available register interface. All of the system 10 is repeated for each channel except the multiplexer 14 and the registers 12.

The frame type input 16 causes the multiplexer 14 to retrieve the correct parity field scrambler value from the registers 12. The parity field scrambler value 18 is exclusive ORed 20 with the received scrambled parity value 22. This descrambles the received scrambled parity value 22 to form the received parity value 36. This is compared in the comparator 34 with the calculated parity value 32. The parity calculating circuit 28 calculates the parity value based on the received bits in the received frame. Since there is a difference in what portion of a frame is covered by the parity value, the circuit 28 receives the frame type from input 16. When the received parity value 36 and the calculated parity value 32 are the same, the output 38 of the comparator 34 indicates a no-error condition. When the received parity value 36 and the calculated parity value 32 are not the same, the output 38 of the comparator 34 indicates an error condition.

The system 10 requires the parity field scrambling values to determine if an error condition exists. For SONET and OTN the scrambling system is defined by a scrambling polynomial. The scrambling polynomial defines a linear feedback shift register. Associated with the scrambling polynomial is an initial linear feedback shift register value and a location at which the scrambling begins in the frame. As the linear feedback shift register is executed it defines a scrambling value for each byte of a frame. By knowing the location of the parity field in the frame, it is possible to calculate the parity field scrambling value for each frame type. The scrambling value is exclusive ORed with the data to form the scrambled value. Since the exclusive OR operation is a conditional inversion of itself, the original parity value may be found by exclusive ORing the scrambled parity value with the parity field scrambling value. FIG. 2 is a chart 50 of relevant parameters used in an error monitoring system and method, for a variety of communication formats, in accordance with one embodiment of the invention. The chart 50 has list of frame types along a row 52 and list of relevant parameters types along a column 54. The first row of parameters is the initial LFSR (Linear Feedback Shift Register) value 56. We see that the initial LFSR value is all ones for all four types of frames. The second row of parameters is the scrambler polynomial 58. All the SONET frames use the same scrambler polynomial. The third row 60 is the hexadecimal representation of the initial scrambler value. The fourth row shows the where the scrambling 62 starts in the frame. The fifth row shows the number of columns per row 64. The sixth row shows the position or location 66 of the parity value in the frame. The seventh row shows the increment value 68 which defines how many times the LFSR has to be incremented to calculate the parity field scrambler value. The final row is the parity field scrambler value 70 in hexadecimal for the four formats.

Figure 3:
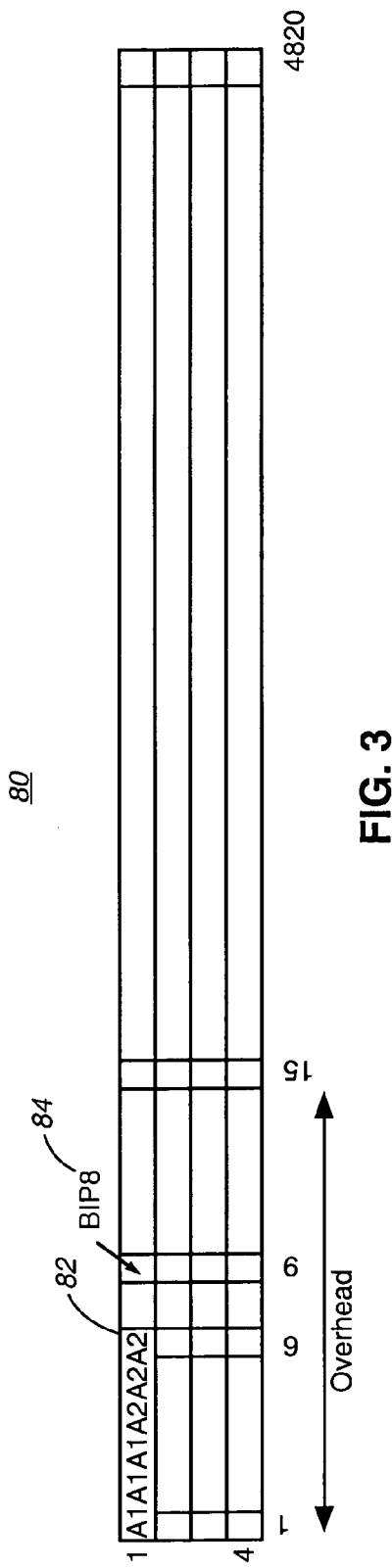
FIG. 3 is a schematic representation of an OTNk (Optical Transport Network—k is a number) frame.

FIG. 3 is a schematic representation of an OTNk (Optical Transport Network—k-designates a data rate) frame 80. The figure shows that the first byte 82 of the frame 80 that is scrambled is column 7 of row 1. The error code coverage is from this byte 82 to the end of the frame. This byte 82 is scrambled with the initial 8-bit scrambler value of 0xFF. The BIP-8 code 84 or parity field in the OTNk frame 80 is located in column 9 of row 1. The scrambler value for the BIP-8 field 84 is obtained by incrementing the byte-wide linear feedback shift register (LFSR) algorithm twice. This gives the hexadecimal value of 0xFE for the descrambling value for the BIP-8 field 84. The scrambling value 70 (FIG. 2) is the same as the descrambling values, since the scrambling processes is an exclusive OR process.

Figure 4:
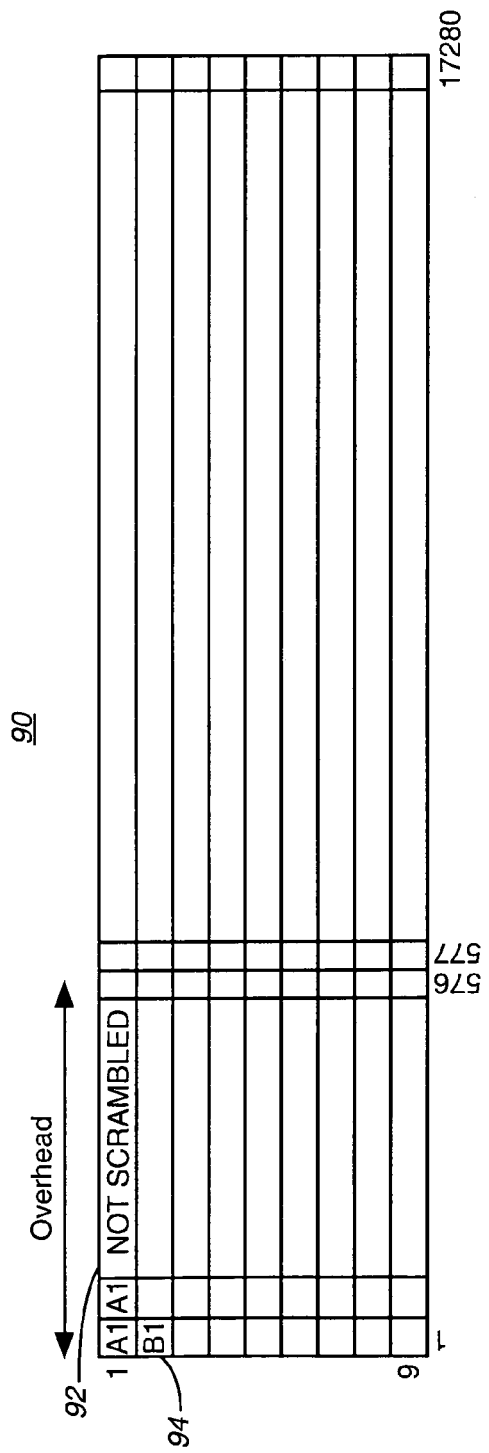
FIG. 4 is a schematic representation of an OC192 (Optical Carrier level) SONET (Synchronous Optical NETwork) frame.

FIG. 4 is a schematic representation of an OC192 (Optical Carrier level) SONET (Synchronous Optical NETwork) frame 90. The overhead 92 of the first row is not scrambled. In addition, the first row of overhead is not covered by the BIP-8 calculation. The scrambling of the frame 90 starts at column 577 of row 1 and continues throughout the entire frame 90. Thus the error code coverage is from colmn 577 of row 1 to the end of the frame 90. In addition, the BIP-8 calculation begins starts at column 577 of row 1 and continues throughout the entire frame 90. The BIP-8 code is calculated for the previous frame and is then stored in the current frame. As a result, at the transceivers the descrambled BIP-8 value of the current frame is compared with the calculated BIP-8 value of the previous frame. If they differ an error signal is generated. The LFSR algorithm of the scrambler of the OC192 frame 90 is initialized with all ones following the last bit of the byte in column 576. The initial scrambler value is applied to column 577 of the first row. The location of the BIP-8 field 94 is column 1 of row 2. The scrambler value is found by incrementing the byte-wide LFSR algorithm 16704 times from column 577 row 1 to column 1 of row 2.

The position of the BIP-8 byte, the scrambler polynomial and the initial value of the scrambler are all the same for OC192, OC12 and OC48 frames. The only difference that affects the calculation of the scrambler value is the total number of columns in the frame. This determines the number of times the LFSR algorithm has to be incremented.

The present system and method significantly reduces the quantity and complexity of an error monitoring system for a transceivers. Previous systems had to descramble the whole frame of the incoming data. The present invention allows a single field of data to be descrambled. By pre-calculating the descrambling value it can be stored in a register rather than being calculated. The error field of the frame is descrambled by exclusive ORing the descrambling value with the received error field. The resulting error value is compared with the calculated error value to determine if an error has occurred in transmission.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. For instance, the invention is described with respect to a parity code word. The invention will work equally well with other error monitoring or error correction codes. Accordingly, it is intended to embrace all such alterations, modifications, and variations in the appended claims.

What is claimed is:

1. An error monitoring system for transceivers, comprising:
   a multiplexer;
   a parity calculating circuit; and
   a comparator having a first input coupled to the multiplexer and a second input coupled to the parity calculating circuit.

2. The system of claim 1, further including an exclusive OR gate having a first input coupled to the multiplexer and a second input coupled to a scrambled parity field register.

3. The system of claim 2, wherein the multiplexer is coupled to a plurality of registers.

4. The system of claim 3, wherein each of the plurality of registers hold a parity field scrambler value for a communication format.

5. The system of claim 4, wherein the multiplexer has a frame type input.

6. The system of claim 2, wherein an output of the exclusive OR gate is coupled to an input of the comparator.

7. A method of error monitoring, comprising the steps of:
   a) pre-calculating a scrambler value for a parity field;
   b) exclusive ORing the scrambler value with a received scrambled parity value to form a received parity value; and
   c) comparing the received parity value with a calculated parity value.

8. The method of claim 7, wherein step (a) further includes the step of:
   a1) calculating a plurality of scrambler values for the parity fields of a plurality of communication standards.

9. The method of claim 8, wherein step (b) further includes the step of:
   b1) determining a frame type;
   b2) retrieving one of a plurality of scrambler value for the parity fields of a plurality of communication standards.

10. The method of claim 9, further including the step of:
    b3) determining a field location of the received scrambled parity value.

11. The method of claim 7, wherein step (a) further includes the steps of:
    a1) determining a linear feedback shift register polynomial;
    a2) determining an initial value.

12. The method of claim 11, further including the steps of:
    a3) determining a location of the received parity value;
    a4) calculating the scrambler value for the location.

13. The method of claim 7, wherein step (b) further includes the steps of:
    b1) receiving a frame of data;
    b2) calculating the parity value for a relevant portion of the frame of data.

14. A method of error monitoring, comprising the steps of:
    a) calculating an error code value for a frame of data to form a calculated error code value;
    b) descrambling just an error code field of a next frame of data to form a received error code value; and
    c) comparing the received error code value to the calculated error code value.

15. The method of claim 14, wherein step (a) further includes the step of:
    a1) determining a frame type;
    a2) determining a coverage of the error code value.

16. The method of claim 14, wherein step (b) further includes the steps of:
    b1) determining a scrambler polynomial for a communication format;
    b2) determining an initial scrambler value for the communication format.

17. The method of claim 16, further including the step of:
    b3) determining a position of the error code field in a frame for the communication format.

18. The method of claim 17, further including the steps of:
    b4) calculating an error code field scrambler value;
    b5) exclusive ORing the error code field scrambler value with a scrambled error code field to form the received error code value.

19. The method of claim 14, wherein step (b) further includes the steps of:
    b1) determining a format of the frame of data;
    b2) retrieving a one of a plurality of scrambler values that corresponds to the format.

20. The method of claim 19, further including the steps of:
    b3) exclusive ORing the one of the plurality of scrambler values with the error code field to form the received error code value.

* * * * *